United States Patent [19]
Strickland et al.

[11] 3,820,751
[45] June 28, 1974

[54] SPHERICAL HEAD TRIPOD

[75] Inventors: Raymond I. Strickland, Huntsville; Lonnie L. Looger, Madison, both of Ala.

[73] Assignee: The United States of America as represented by the Secretary of the Army, Washington, D.C.

[22] Filed: Nov. 22, 1972

[21] Appl. No.: 308,897

[52] U.S. Cl. .............................................. 248/181
[51] Int. Cl. ......................................... F16m 11/14
[58] Field of Search .......... 248/180, 181, 166, 168, 248/177, 178, 179

[56] References Cited
UNITED STATES PATENTS

| | | | |
|---|---|---|---|
| 508,319 | 11/1893 | Ivarson | 248/181 |
| 807,078 | 12/1905 | Hoelzer | 248/181 |
| 2,439,194 | 4/1948 | Wild | 248/181 |
| 2,775,423 | 12/1956 | Strass | 248/180 |
| 3,094,802 | 6/1963 | Perry | 248/168 X |

FOREIGN PATENTS OR APPLICATIONS

| | | | |
|---|---|---|---|
| 144,068 | 7/1920 | Great Britain | 248/181 |
| 821,052 | 5/1906 | Great Britain | 248/177 |

*Primary Examiner*—William H. Schultz
*Assistant Examiner*—Robert W. Gibson, Jr.
*Attorney, Agent, or Firm*—Edward J. Kelly; Herbert Berl; Charles R. Carter

[57] ABSTRACT

A spherical leveling head tripod for use in making an attached instrument support platform level. The platform is mounted on the tripod for relative movement with respect to the leveling head. After setting up a tripod and roughly leveling it, the platform is moved any direction in a 360° arc on the spherical head. When a level indicator shows that a level position has been obtained the platform is then locked in a fixed position.

3 Claims, 3 Drawing Figures

PATENTED JUN 28 1974 3,820,751
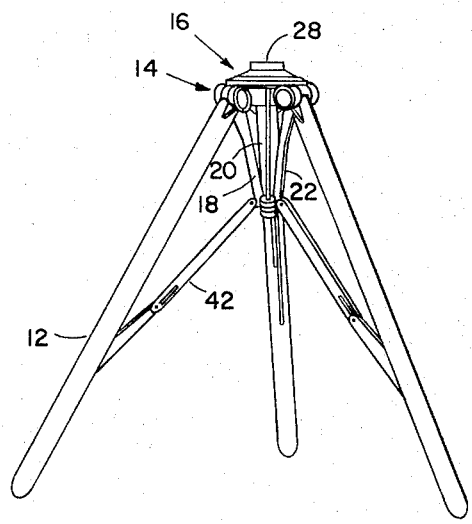
FIG. I
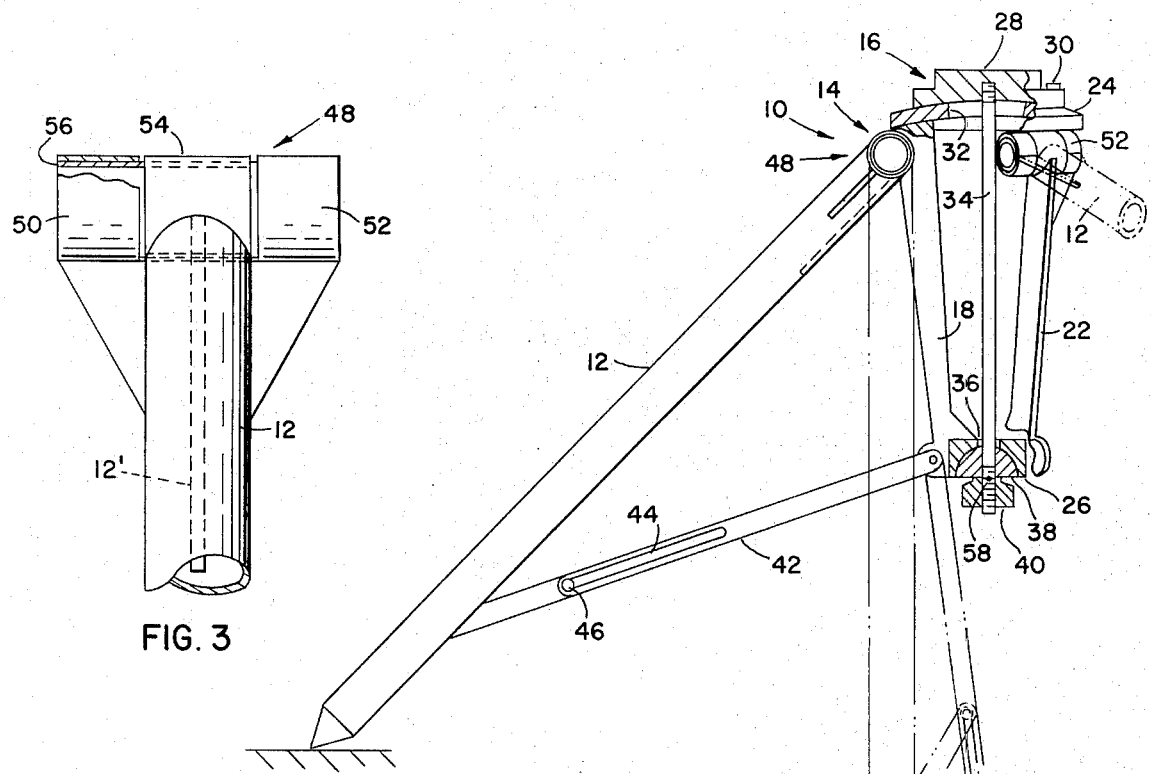
FIG. 3
FIG. 2

SPHERICAL HEAD TRIPOD

BACKGROUND OF THE INVENTION

This invention relates to the field of tripods. Previous tripods had a problem which involved considerable adjustment of the tripod legs to level a support platform attached to the tripod. Because of this adjustment problem, much effort was required to set up the tripod for operation, resulting in a loss of time.

SUMMARY OF THE INVENTION

The present invention has solved this problem by providing a spherical support head which includes a platform rotatable with respect to the tripod legs. After the legs are adjusted to approximately level the head a friction lock is loosened and the platform is rotated to a level position. The lock is then tightened to secure against movement of the head.

This invention may be better understood from the following detailed description taken in conjunction with the accompanying drawing.

BRIEF DESCRIPTION OF THE DRAWINGS

FIG. 1 is a perspective view of the spherical head tripod.

FIG. 2 is a partial side view partly in section showing one leg assembly extended and closed.

FIG. 3 is a view showing the pivotal connection at a tripod leg.

DESCRIPTION OF THE PREFERRED EMBODIMENT

Reference numeral 10 indicates a tripod having legs 12 pivotally connected at 14 to a spherical leveling head generally indicated as 16 and shown in FIG. 1. The spherical leveling head consists of three frame sections 18, 20 and 22 connected at their upper ends to a spherical plate 24 and at their lower ends to a block 26. An instrument support platform 28 has a spherical shaped underside to mate with the surface of plate 24 and this platform is provided with a bubble 30 for leveling purposes. The plate 24 is provided with a circular opening 32 at its center to allow movement of a rod 34 which has one end connected to platform 28. The other end of the rod passes through an opening 36 in block 26 and through a hemispherical bearing 38 and is threaded for connection with a rotatable friction lock 40.

Each tripod leg is connected to a brace 42 that is provided with a slot 44 and a bolt 46 for roughly adjusting the legs. The pivot connection 14 of the legs to the spherical leveling head is more clearly shown in FIG. 3.

An outer segmented cylinder 48 consists of two opposite end parts 50 and 52 that are fixedly connected to tripod leg 12 and a center part 54 that is fixedly connected to frame section 18. This outer cylinder is telescoped over a single piece inner cylinder 56 which provides a bearing surface for rotational movement therebetween. Each leg 12 includes a slot 12' that allows partial entry of frame sections 18, 20 and 22 when legs are folded together as shown in phantom in FIG. 2.

In operation the tripod legs 12 are set up and adjusted by their respective brace and bolt settings to provide a rough leveling capability. This brings platform 28 to within the adjustment capability of the spherical head. Friction lock 40 is loosened and the platform 28 is moved any direction of a 360° are on the spherical head leveling plate 24 until the bubble indicates that the platform 28 is level. Reference numeral 58 indicates the center point of spherical turning of the leveling head. The friction lock is then tightened and the tripod is ready for use such as a transit, surveyor's level, missile launching tripod, camera tripod or a tracker tripod.

We claim:

1. A spherical head tripod for use in making an attached support platform level, said tripod comprising: a spherical leveling head including a spherical shaped plate, a connecting block, a plurality frame sections, the upper end of each frame section being connected to said spherical shaped plate and the lower end of each frame section being connected to said connecting block, a hemispherical bearing disposed in said block for rotational movement therein, a suport platform provided with a spherical shaped underside for cooperating movement on said spherical shaped plate, a rod for connecting said plate with said bearing, said plate and said bearing each being provided with an opening for rod movement therein; a plurality of legs pivotally connected to and supporting said spherical leveling head and an adjustable brace connected between said legs and the lower end of each frame section.

2. A spherical head tripod as set forth in claim 1 wherein the pivotal connection for said legs includes an outer segmented cylinder telescoped over a single piece inner cylinder to provide rotational movement therebetween, said segmented cylinder having opposite end segmented parts connected to said legs and a center segmented part connected to said spherical leveling head.

3. A spherical head tripod as set forth in claim 2 wherein said platform is provided with a level bubble and said rod is provided with a friction lock for locking said platform.

* * * * *